(12) United States Patent
Lee

(10) Patent No.: US 11,475,394 B2
(45) Date of Patent: Oct. 18, 2022

(54) METHOD AND APPARATUS FOR PROVIDING INFORMATION

(71) Applicant: Coupang Corp., Seoul (KR)

(72) Inventor: Seung Hwan Lee, Seoul (KR)

(73) Assignee: Coupang Corp., Seoul (KR)

(*) Notice: Subject to any disclaimer, the term of this patent is extended or adjusted under 35 U.S.C. 154(b) by 0 days.

(21) Appl. No.: 17/194,829

(22) Filed: Mar. 8, 2021

(65) Prior Publication Data

US 2022/0270038 A1    Aug. 25, 2022

(30) Foreign Application Priority Data

Feb. 22, 2021  (KR) .................. 10-2021-0023497

(51) Int. Cl.
*G06Q 10/08* (2012.01)

(52) U.S. Cl.
CPC ....... *G06Q 10/0833* (2013.01); *G06Q 10/087* (2013.01)

(58) Field of Classification Search
CPC .. G06Q 10/08; G06Q 10/083; G06Q 10/0833; G06Q 10/087; G06Q 30/0623; G06Q 30/0641; G06Q 20/203; G06Q 30/00; G06Q 30/0222; G06Q 30/0253; G06Q 30/06
See application file for complete search history.

(56) References Cited

U.S. PATENT DOCUMENTS 8,046,262 B1 * 10/2011 Antony .............. G06Q 30/0601
                                                                 705/26.1
8,175,935 B2 *  5/2012 Dearlove ............... G06Q 10/08
                                                                  705/27.1
10,540,686 B1 *  1/2020 Hughes .............. G06Q 30/0635
10,769,588 B1 *  9/2020 Kim .................... G06F 16/9535
10,860,972 B1 * 12/2020 Rehn .................. G06Q 30/0641

(Continued)

FOREIGN PATENT DOCUMENTS

CN          107944797 A       4/2018
CN          109492828 A       3/2019

(Continued)

OTHER PUBLICATIONS

"How does Minimum Delivery time work with Same day & Next day cutoff settings," by Rashmi Malpande, Mar. 9, 2020 (Year: 2020).*

(Continued)

*Primary Examiner* — Jeff Zimmerman
*Assistant Examiner* — Brian Adams Heflin
(74) *Attorney, Agent, or Firm* — Knobbe, Martens, Olson & Bear, LLP

(57) ABSTRACT

Provided is a method of providing information by a service server, the method including acquiring input information from a user, confirming corresponding item information based on the input information, acquiring item delivery-related information from a distribution server based on the item information, confirming first information on or regarding an estimated delivery completion time of the item and second information on an order closing time corresponding to the first information based on the item delivery-related information; and providing a first page including the item information, the first information, and the second information.

13 Claims, 17 Drawing Sheets

(56) References Cited

U.S. PATENT DOCUMENTS

| | | | |
|---|---|---|---|
| 2006/0287939 A1* | 12/2006 | Harel | G06Q 20/203 |
| | | | 705/37 |
| 2017/0024804 A1* | 1/2017 | Tepfenhart, Jr. | G06Q 30/0635 |
| 2017/0255903 A1* | 9/2017 | Chowdhry | G06Q 10/0833 |
| 2018/0012158 A1* | 1/2018 | Cholewinski | G06Q 10/087 |
| 2018/0315002 A1* | 11/2018 | Rotman | G06Q 30/0635 |
| 2022/0114689 A1* | 4/2022 | Cline | G06Q 10/06315 |

FOREIGN PATENT DOCUMENTS

| | | | |
|---|---|---|---|
| CN | 113935612 A * | 1/2022 | |
| JP | 6629490 62 | 1/2020 | |
| KR | 10-2006-0070286 A | 6/2006 | |
| KR | 10-2016-0134178 A | 11/2016 | |
| KR | 10-2017-0056251 A | 5/2017 | |
| KR | 10-1735018 B1 | 5/2017 | |
| KR | 20170114120 | 10/2017 | |
| KR | 10-1845925 B1 | 4/2018 | |
| KR | 10-2051464 B1 | 12/2019 | |
| WO | WO-2016166708 A1 * | 10/2016 | G06Q 10/087 |

OTHER PUBLICATIONS

"How Countdown timers can be used to drive ecommerce sales," by Graham Charlton, Jan. 31, 2017 (Year: 2017).*

"Valiant Announces 'The Life and Death of Toyo Harada,' Pre-Order Edition Bundle," Latest Comics News, Jan. 14, 2019 (Year: 2019).*

"About Pre-orders and Back Orders," Amazon, Jan. 26, 2021 (Year: 2021).*

"Bun Appetit," Jan. 24, 2021 (Year: 2021).*

"Release Time Scheduling and Hub Location for Next-Day Delivery," by Hande Yaman, Oye Ekin Karasan, and Bahar Y. Kara, Department of Industrial Engineering, Bilkent University, vol. 60, No. 4, Jul.-Aug. 2012, p. 906-917 (Year: 2012).*

"Single-Machine batch delivery scheduling with job release dates, due windows and earliness, tardiness, holding and delivery costs," by Fardin Ahmadizar and Soma Farhadi, Department of Industrial Engineering, Aug. 30, 2014 (Year: 2014).*

* cited by examiner

METHOD AND APPARATUS FOR PROVIDING INFORMATION

BACKGROUND

Technical Field

Example embodiments of the present disclosure relate to a method and apparatus for providing information for adaptively displaying an estimated arrival time of a product in an e-commerce transaction and, more particularly, to a method and apparatus for providing information for acquiring item delivery-related information from a distribution server based on item information and providing a page including an estimated delivery completion time of an item and an order closing time corresponding thereto based on the item delivery-related information.

Description of the Related Art

As the use of the Internet becomes more common, the e-commerce market is expanding. In particular, with the spread of infectious diseases, the proportion of items purchased by visiting offline stores is decreasing, while the proportion of products purchased through e-commerce transactions using computers or smartphones is rapidly increasing.

E-commerce companies take a business method of directly delivering sold items to delivery destinations desired by consumers. Accordingly, it is important to provide accurately estimated delivery completion time to consumers who purchase items for high consumer confidence and satisfaction. For example, Korean Registered Patent No. 1845925 discloses a mechanism for collecting delivery status information and location information from the release of items to the delivery of items, deriving the estimated delivery time of the items based on the collected information, and providing the derived time to customer terminals.

However, the related art document does not disclose configurations which update the estimated delivery time that is changed due to unforeseen situations such as bad weather, infectious diseases, and power outages and change and display the updated time to customers in real time. The estimated delivery completion time is bound to fluctuate according to the changes in the situations, and a significant difference between the estimated delivery completion time and the actual arrival time may lead to a decrease in consumer confidence and satisfaction. As a result, there is a need to inform consumers of the accurately predicted estimated delivery completion time by reflecting the changes in the situations in real time.

SUMMARY

Technical Goals

An aspect provides a method and apparatus for acquiring delivery-related information on or regarding an item from a distribution server, confirming information on an estimated delivery completion time of the item and information on an order closing time corresponding to the information based on the delivery-related information, and adaptively displaying delivery time-related information by reflecting a change in situation in real time.

Technical Solutions

According to an aspect, there is provided a method of providing information by a service server, the method including acquiring input information from a user, confirming corresponding item information based on the input information, acquiring item delivery-related information from a distribution server based on the item information, confirming first information on an estimated delivery completion time of the item and second information on an order closing time corresponding to the first information based on the item delivery-related information, and providing a first page including the item information, the first information, and the second information.

The item delivery-related information may be acquired by additionally considering delivery destination information of the user and fulfillment center information corresponding to the delivery destination information.

The first information may include a guaranteed delivery completion time of the item, and the second information may include a remaining time until the order closing time corresponding to the first information.

The item delivery-related information may be confirmed based on information on one or more candidate fulfillment centers selected based on the delivery destination information of the user, and the information on the one or more candidate fulfillment centers may include inventory information corresponding to the item and an estimated release time corresponding to the item.

The item delivery-related information may be confirmed based on information on a first fulfillment center performing fastest delivery among the one or more candidate fulfillment centers.

The method of providing information may further include confirming abnormality information of the first fulfillment center and updating the first information based on information on a second fulfillment center performing fastest delivery other than the first fulfillment center among the one or more candidate fulfillment centers.

The first page may additionally display a notification related to the update.

At least one of the first information or the second information may vary depending on whether the user is signed up for membership.

At least one of the first information or the second information may vary depending on an item purchase history of the user.

The first page may be one of a page displaying detailed information of the item, a page displaying a search result of the item, and a page displaying a list of items selected by the user.

The first information may include a fastest guaranteed delivery completion time and a second-fastest guaranteed delivery completion time, and when the remaining time is less than or equal to zero, the first information and the second information may be updated based on the second-fastest guaranteed delivery completion time.

The first page may additionally display an alarm when the remaining time is within a reference time.

According to another aspect, there is also provided a method of providing information by a user terminal, the method including acquiring input information from a user, transmitting the acquired input information to a service server, receiving a first page from the service server, and displaying the received first page, wherein the service server is configured to confirm corresponding item information based on the input information, acquire item delivery-related information from a distribution server based on the item information, confirm first information on an estimated delivery completion time of the item and second information on an order closing time corresponding to the first information based on the item delivery-related information, and provide a first page including the item information, the first information, and the second information.

According to another aspect, there is also provided a service server for providing information, the service server including a transceiver configured to transmit and receive information to and from other apparatuses and a processor controlling the transceiver and configured to acquire input information from a user, confirm corresponding item information based on the input information, acquire item delivery-related information from a distribution server based on the item information, confirm first information on an estimated delivery completion time of the item and second information on an order closing time corresponding to the first information based on the item delivery-related information, and provide a first page including the item information, the first information, and the second information.

According to another aspect, there also is provided a user terminal for providing information, the user terminal including a transceiver configured to transmit and receive information to and from other apparatuses and a processor controlling the transceiver and configured to acquire input information from a user, transmit the acquired input information to a service server, receive a first page from the service server, in which the service server is configured to confirm corresponding item information based on the input information, acquire item delivery-related information from a distribution server based on the item information, confirm first information on an estimated delivery completion time of the item and second information on an order closing time corresponding to the first information based on the item delivery-related information, and provide a first page including the item information, the first information, and the second information, and display the received first page.

Effects

According to example embodiments, it is possible to increase user satisfaction and reliability for use of e-commerce pages and prevent purchase satisfaction and reliability of a user from decreasing due to the unexpected delivery delay by reflecting fulfillment center information in real time and providing a guaranteed arrival time.

According to example embodiments, it is possible for a user to accurately and intuitively acquire estimated delivery time-related information by recognizing a guaranteed delivery completion time and an order closing time in which items should be ordered to receive the items delivered within the guaranteed delivery completion time, thereby encouraging customers to quickly purchase items.

DETAILED DESCRIPTION

Figure 1:
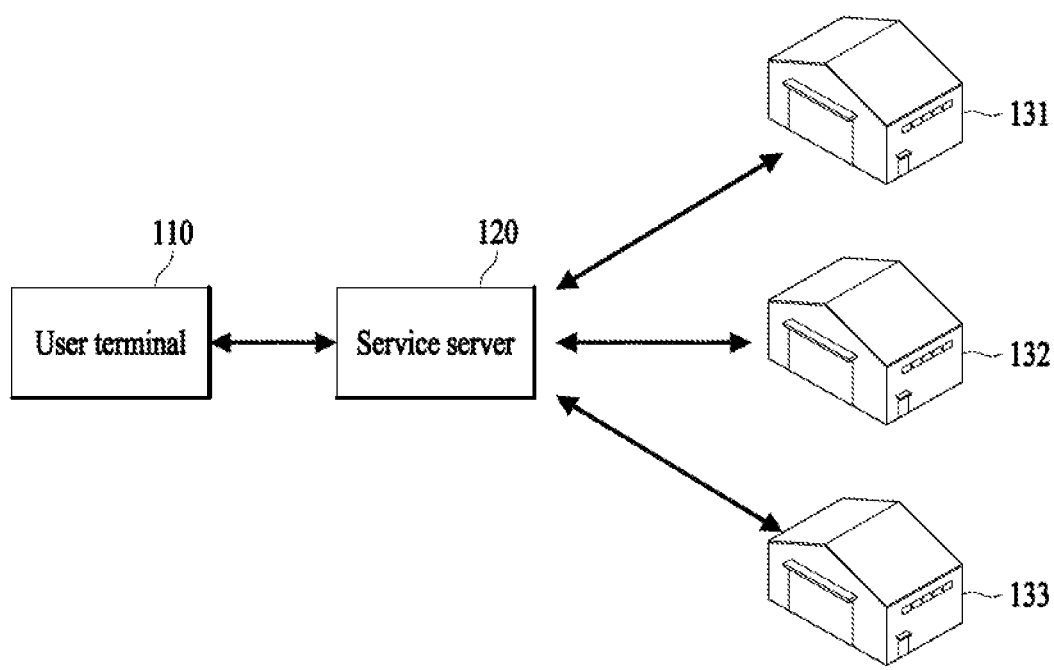
FIG. 1 is a diagram schematically illustrating a configuration of a system for providing information for adaptively displaying delivery time-related information of an item according to an example embodiment of the present disclosure.

Hereinafter, example embodiments of the present disclosure will be described in detail with reference to the drawings.

In describing the example embodiments, descriptions of technical contents that are well known in the technical field to which the present disclosure pertains and not directly related to the present disclosure will be omitted. This is to more clearly convey the gist of the present disclosure without ambiguity by omitting unnecessary descriptions.

For the same reason, some components in the accompanying drawings are exaggerated, omitted, or schematically illustrated. In addition, the size of each component does not entirely reflect the actual size. The same reference numerals are assigned to the same or corresponding components in each drawing.

Various advantages and features of the present disclosure and methods accomplishing the same will become apparent from the following description of the example embodiments with reference to the accompanying drawings. However, the present disclosure is not limited to the example embodiments to be described below but may be implemented in various different forms, these example embodiments will be provided only in order to make the present disclosure complete and allow those skilled in the art to completely recognize the scope of the present disclosure, and the present disclosure will be defined by the scope of the claims. Throughout the specification, like reference numerals denote like components.

In this case, it will be appreciated that each block of a processing flowchart and combinations of the flowcharts may be executed by computer program instructions. Since these computer program instructions may be installed in a processor of a general computer, a special purpose computer, or other programmable data processing apparatuses, these computer program instructions executed through the processor of the computer or the other programmable data processing apparatuses create a means for performing functions described in the block(s) of the flowchart. Since these computer program instructions may also be stored in a computer usable or computer readable memory of a computer or other programmable data processing apparatuses in order to implement the functions in a specific scheme, the computer program instructions stored in the computer usable or computer readable memory can also produce manufacturing articles including an instruction means for performing the functions described in the block(s) of the flowchart. Since the computer program instructions may also be installed in the computer or the other programmable data processing apparatuses, the instructions perform a series of operation steps on the computer or the other programmable data processing apparatuses to create processes executed by the computer, thereby running the computer, or the other programmable data processing apparatuses may also provide operations for performing the functions described in the block(s) of the flowchart.

In addition, each block may indicate some modules, segments, or codes including one or more executable instructions for executing a specific logical function(s). Further, it is to be noted that functions mentioned in the blocks occur regardless of a sequence in some alternative example embodiments. For example, two blocks that are consecutively shown may in fact be simultaneously performed or performed in a reverse sequence depending on corresponding functions.

In this case, the term "unit" used in this example embodiment refers to software or hardware components such as a field-programmable gate array (FPGA) or an application-specific integrated circuit (ASIC), and the "unit" performs certain roles. However, "unit" is not limited to the software or the hardware. "unit" may be configured to be stored in a storage medium that can be addressed or may be configured to regenerate one or more processors. Therefore, as an example, "unit" includes components such as software components, object-oriented software components, class components and task components, processes, functions, attributes, procedures, subroutines, segments of a program code, drivers, firmware, a microcode, a circuit, data, a database, data structures, tables, arrays, and variables. Components and functions provided within "units" may be combined with a smaller number of components and "units" or be separated from additional components and "units". In addition, components and "units" may be implemented to reproduce one or more central processing units (CPUs) in a device or a security multimedia card.

FIG. 1 is a diagram schematically illustrating a configuration of a system for providing information for adaptively displaying delivery time-related information of an item according to an example embodiment of the present disclosure.

Referring to FIG. 1, a system for providing information according to the example embodiment of the present disclosure may include a user terminal 110, a service server 120, and one or more distribution servers 131, 132, and 133.

An e-commerce user may access the service server 120 using the user terminal 110. The user terminal 110 has an e-commerce application installed and may access the service server 120 under the control of the application and use e-commerce based on information exchange with the service server 120. The user terminal 110 may be a mobile device such as a smart phone and a tablet personal computer (PC), or a static device such as a desktop PC, and any device in which an e-commerce application can be installed and executed may be used as the user terminal 110 without limitation.

The service server 120 may communicate with the user terminal 110 and provide information related to e-commerce to the user terminal 110. In addition, the service server 120 may communicate with at least one distribution server 131, 132, and 133 and receive information related to a fulfillment center or information related to delivery manpower of the fulfillment center.

The distribution server 131, 132, 133 may be operated by a manager of the fulfillment center and may manage the fulfillment center and provide the information related to the fulfillment center to the service server 120. The distribution servers 131, 132, and 133 may be operated as one server per fulfillment center. Alternatively, one server may manage all fulfillment centers, and one distribution server may manage logistics-related information while communicating with servers of a plurality of fulfillment centers. Three distribution servers are illustrated in FIG. 1, which is merely an example. Accordingly, the number of distribution servers is not intended to be limited.

Figure 2:
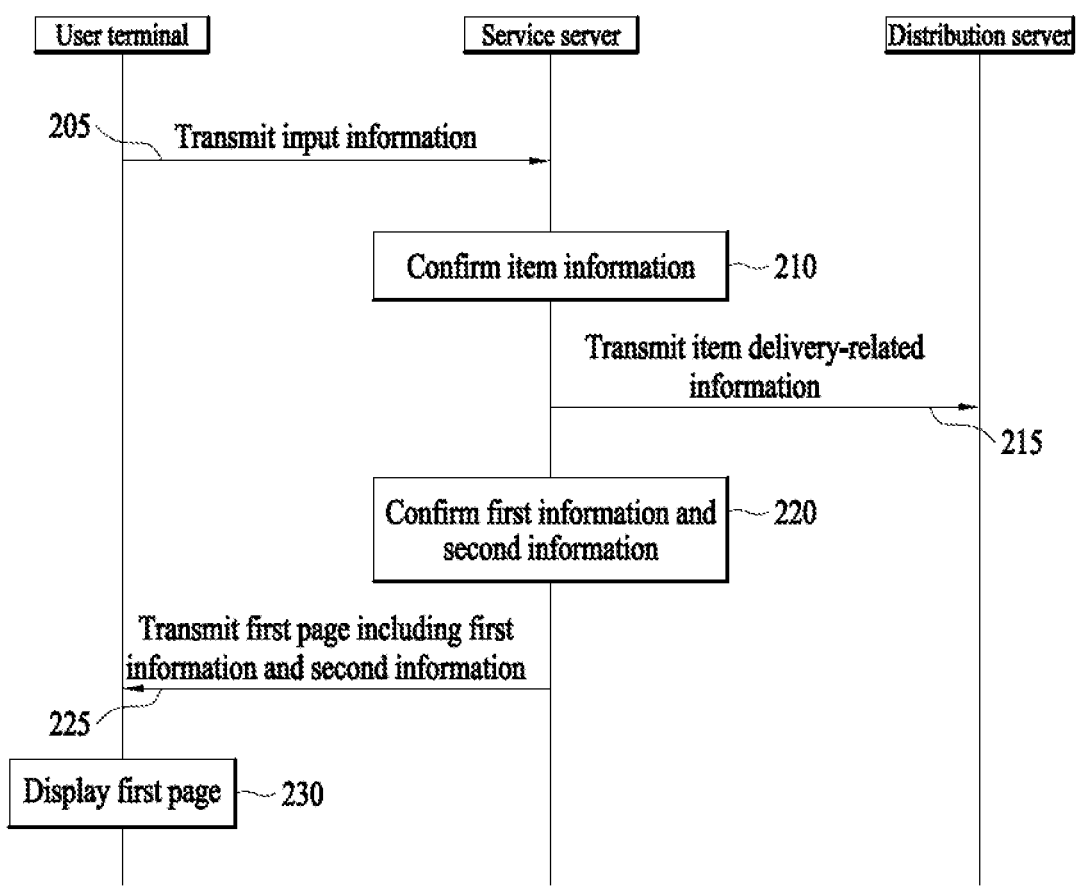
FIG. 2 is a sequence diagram illustrating information exchange of each node related to a method of providing information for adaptively displaying the delivery time-related information of an item according to an example embodiment of the present disclosure and an operation corresponding to the information exchange.

FIG. 2 is a sequence diagram illustrating information exchange of each nodes related to a method of providing information for adaptively displaying the delivery time-related information of an item according to an example embodiment of the present disclosure and an operation corresponding to the information exchange.

Referring to FIG. 2, a method of exchanging information between the user terminal, the service server, and the distribution server and an operation method in each node according to the example embodiment of the present disclosure are disclosed.

In operation 205, the user terminal may transmit input information acquired from the user to the service server. The input information may include a keyword for an item, and the keyword may be a general name of the item or may be a name that limits the manufacturer, capacity, size, weight, material, or the like of the item. Keywords may be directly input to a search window by a user through the user terminal, or keywords listed on a page may be clicked or tapped by a user through the user terminal or input by using another input device.

In operation 210, the service server may confirm corresponding item information based on the input information received from the user terminal. The service server may confirm the corresponding item from a storage of the service server based on the input information.

In operation 215, the service server may acquire item delivery-related information from the distribution server. The item delivery-related information may be acquired by allowing the service server to transmit a request for the item delivery-related information along with item information and a delivery destination address of a user to the distribution server, and the distribution server to provide information corresponding to the request to the service server.

The item delivery-related information may be acquired by additionally considering delivery destination information of a user and fulfillment center information corresponding to the delivery destination information of the user. The fulfillment center information may include inventory information corresponding to an item and estimated release time information corresponding to the item. The inventory information of the item may include information such as the quantity, quality, storage status, and delivery availability of the item provided in the fulfillment center. In addition, the estimated release time information of the item may be determined in consideration of information on or regarding available delivery personnel of the fulfillment center and whether or not the fulfillment center is abnormal (for example, delivery is impossible due to power outages, heavy snow, or the like). The item delivery-related information may be confirmed based on information on one or more candidate fulfillment centers selected based on the delivery destination information. In the example embodiment, the item delivery-related information may be configured based on information on a fulfillment center capable of fastest delivery among one or more candidate fulfillment centers.

In operation 220, the service server may confirm first information on the estimated delivery completion time of the item and second information on an order closing time corresponding to the first information based on the item delivery-related information acquired from the distribution server. The estimated delivery completion time refers to a time when delivery is expected to be completed when a customer orders an item. The first information on the estimated delivery completion time may also include a guaranteed delivery completion time indicating a time period in which delivery may be ensured when the customer orders the item. The guaranteed delivery completion time may be displayed on a page, like "guaranteed arrival today," "guaranteed arrival tomorrow morning," "guaranteed delivery before next Monday," or the like. The order closing time is associated with the estimated delivery completion time and may mean the latest time when an item should be ordered to receive delivery of the item at the estimated delivery completion time and may be displayed as, for example, "order before 4 pm" on the page," "order today," or the like. The first information on the estimated delivery completion time may be displayed on the page alone or may be displayed together with the second information on the order closing time (for example, "Guaranteed arrival tomorrow morning when you order before 4 pm").

In the example embodiment, the first information and the second information may vary depending on the item information, the fulfillment center information, the delivery destination address information of the user, whether a user is signed up for membership, a purchase history of a user, and the like. For example, when an item is an item to be delivered on the same day like fresh food, the guaranteed delivery completion time may be set earlier than a general case. As another example, when an item is in stock in a fulfillment center close to an address of a user, the guaranteed delivery completion time may be "guaranteed delivery today," but when an item is out of stock in the fulfillment center close to the address of the user and a fulfillment center in which an item is in stock is far from the address, the guaranteed delivery completion time may be "guaranteed arrival tomorrow afternoon" or "guaranteed arrival the day after tomorrow." As another example, the service server may set the guaranteed delivery completion time only when a user is a member who is signed up for the membership, and when the user is a member who does not sign up for membership, the guaranteed delivery completion time may not be set or displayed. As another example, the service server may provide a benefit of setting the order closing time to a later time than the case in which the user is the member who is signed up for the membership. In this way, the membership subscribers may receive faster delivery, and to receive such a delivery, the delivery is possible until a later time. In this way, when an order of the membership subscriber is provided to the distribution server, the order may be provided to the distribution server by including the information indicating whether the user is signed up for the membership, and the distribution server may perform the release and delivery so that the delivery to the user who is signed up for the membership may be performed quickly based on the information. As another example, when a user has a history of purchasing a number of items in the past, he/she may be assigned benefits of setting the order closing time to a later time than the original time.

In the example embodiment, the service server may calculate the estimated time to deliver an item to an address of a user for each of one or more fulfillment centers that can deliver the item to the address of the user and set the guaranteed delivery completion time based on the estimated delivery time of the fulfillment center which is expected to complete the fastest delivery. As another example, when the address of the user is an isolated region or when there is difficulty in traffic due to heavy snow the day before, the guaranteed delivery completion time may be set to a later time than the general case, or the guaranteed delivery completion time may not be set.

In the example embodiment, the delivery destination address information of the user may include one or more delivery destination addresses and may include a representative delivery destination address that a customer selects to use the most as a delivery destination, and a recent delivery address to which the latest delivery has been made.

In the example embodiment, the guaranteed delivery completion time may be updated in real time by allowing the service server to receive the fulfillment center information from the distribution server. For example, when an item is out of stock in the fulfillment center close to the user, but the stock for the item is added later, the distribution server may transmit the fulfillment center information including information that the stock for the item has been added to the fulfillment center close to the user to the service server, and the service server may set the guaranteed delivery completion time to a time earlier than the original time. As another example, when the fulfillment center that is scheduled to deliver the item to the delivery destination of the user is in a state that may not be operated due to power outages, heavy snow, infectious diseases, or the like, the distribution server may transmit the abnormality information of the fulfillment center, which includes the information that the corresponding fulfillment center may not be operated, to the service server, and the service server may update the first information on the guaranteed delivery completion time based on the estimated delivery time of the fulfillment center that is expected to complete the delivery the second fastest. In this way, it is possible to increase the user satisfaction and reliability for the use of the e-commerce page and to prevent the decrease in purchase satisfaction and reliability due to unexpected delivery delays by setting the guaranteed delivery completion time by reflecting the fulfillment center information in real time.

In operation 225, the service server may provide a first page including the item information, the first information, and the second information to the user terminal. The first page may display the guaranteed delivery completion time alone as the delivery time-related information of the item or may be displayed together with the order closing time corresponding to the guaranteed delivery completion time.

In the example embodiment, the first page provided by the service server may be a page that acquires information on an item from a database that manages the information on the item based on a keyword and displays a search result including an item corresponding to the keyword. The first page may include information corresponding to the search keyword and may include information on an item, such as a picture, price, and manufacturer of the item corresponding to the search keyword. In addition, the page may include not only the information on the item but also the item's delivery information such as the estimated delivery completion time, the guaranteed delivery completion time, and special delivery (for example, a delivery service that ensures faster delivery than general delivery, regular delivery that regularly delivers items upon request, early morning delivery to ensure delivery of an item at the dawn of the next day after the item is ordered, and the like) availability, benefit information such as membership discount, an applicable coupon, and a reserve, and review information such as reviews and ratings of purchasers. When listing items that satisfy the search request, the number (for example, 36, 48, 60, 72, or the like) of items exposed per page may be selected by the user.

In the example embodiment, the first page generated by the service server may be a page displaying detailed information of a specific item. A user may enter a page that displays detailed information on an item through the input corresponding to the information related to the specific item from the page displaying the search result of the item through the user terminal, and the service server may provide such a page. The page may include detailed information including the picture, size, weight, color, material, and the like of the item, a review of an item, an item inquiry, delivery/exchange/return information, and the like. In addition, the page may include interactive elements such as "immediate purchase," "put in a shopping cart," and fields for quantity selection.

In the example embodiment, the first page generated by the service server may be a shopping cart page listing items that a user selects. A user may enter the shopping cart page by clicking an item's search result page, an item's detailed information page, or an icon on another page or by interacting in another way and may add the selected item to a virtual shopping cart by clicking one or more items on the item's search result page or clicking the icon on the item's detailed information page. In the example embodiment, the page may not only list all the items that the user has added to the virtual shopping cart but may also display information on items put in a shopping cart, such as a quantity of each item, a price per product of each item, a price based on a relevant quantity of each item, an estimated delivery date, a delivery method, a delivery cost, interactive elements (for example, deletion of an item or modification of quantity), an option for ordering other items or setting regular delivery of an item, and interactive elements for making purchase.

In operation 230, the user terminal may display the first page received from the service server through the display. In the example embodiment, the user terminal may display the guaranteed delivery completion time alone as the delivery time-related information of the item together with the information on the item on the page or display the guaranteed delivery completion time together with the order closing time (for example, "guaranteed arrival tomorrow morning when you order before 4 pm today").

In the example embodiment, the order closing time may be indicated as a remaining time. The remaining time is a time obtained by subtracting the order closing time from the current time. For example, when the current time is 2:41:32 pm and the order closing time when an item should be ordered to ensure delivery tomorrow morning is 6 pm, the remaining time is 3 hours 18 minutes 28 seconds. In this case, the delivery time-related information displayed together with the item may be displayed as a phrase "guaranteed arrival tomorrow morning when you order within 3 hours 18 minutes 28 seconds." The remaining time may decrease as time passes, and change according to the order closing time updated from the service server.

Figure 3:
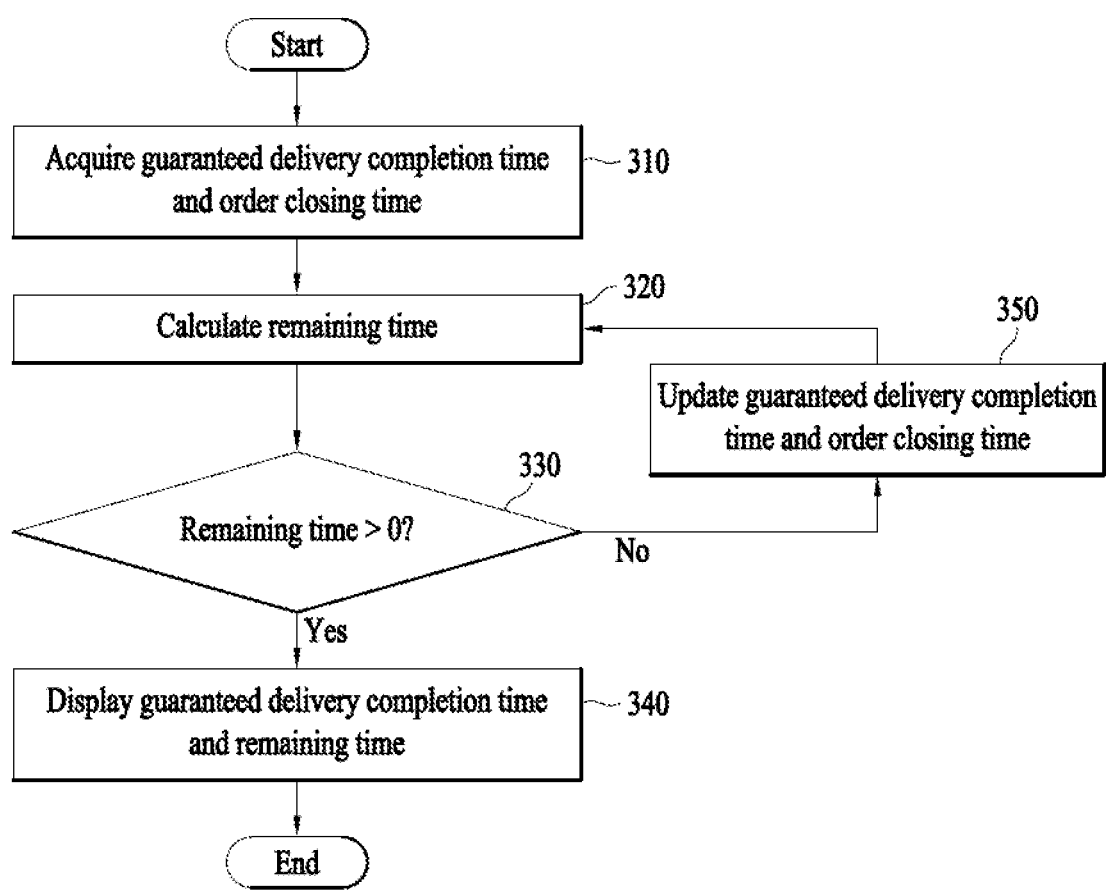
FIG. 3 is a flowchart illustrating an exemplary method of calculating a remaining time and a guaranteed delivery completion time to display the delivery time-related information by a user terminal according to an example embodiment of the present disclosure.

FIG. 3 is a flowchart illustrating an exemplary method of calculating a remaining time and a guaranteed delivery completion time to display the delivery time-related information by a user terminal according to an example embodiment of the present disclosure.

In operation 310, the user terminal may acquire, as the delivery time-related information of the item, the guaranteed delivery completion time and the order closing time associated with the guaranteed delivery completion time. In the example embodiment, the user terminal may acquire the next guaranteed delivery completion time to be extended and the associated next order closing time when the remaining time is less than zero together with the guaranteed delivery completion time and the associated order closing time.

In operation 320, the user terminal may calculate the remaining time. The remaining time is calculated by subtracting the order closing time from the current time and means the time remaining until the order closing time.

In operation 330, the user terminal may determine whether the remaining time is greater than zero.

When the remaining time is greater than zero (that is, when the current order closing time has not elapsed), in operation 340, the remaining time and the guaranteed delivery completion time may be displayed together. For example, in displaying the delivery information of the item, the user terminal may display a message "guaranteed arrival tomorrow afternoon when you order within 3 minutes 29 seconds."

When the remaining time is not greater than zero (that is, when the current order closing time has elapsed), in operation 350, the user terminal may update the guaranteed delivery completion time and the associated order closing time. The user terminal may request new guaranteed delivery completion time and the associated order closing time information from the service server. According to another example embodiment, the delivery time-related information of the item acquired by the user terminal may include the fastest guaranteed delivery completion time and the second-fastest guaranteed delivery completion time, and when the remaining time is not greater than zero, the guaranteed delivery completion time may be updated based on the fast guaranteed delivery completion time, and thus, the order closing time associated with the guaranteed delivery completion time may also be updated. When the guaranteed delivery completion time and the associated order closing time are updated, a process returns to operation 320, and the user terminal may calculate the remaining time.

Figure 4:
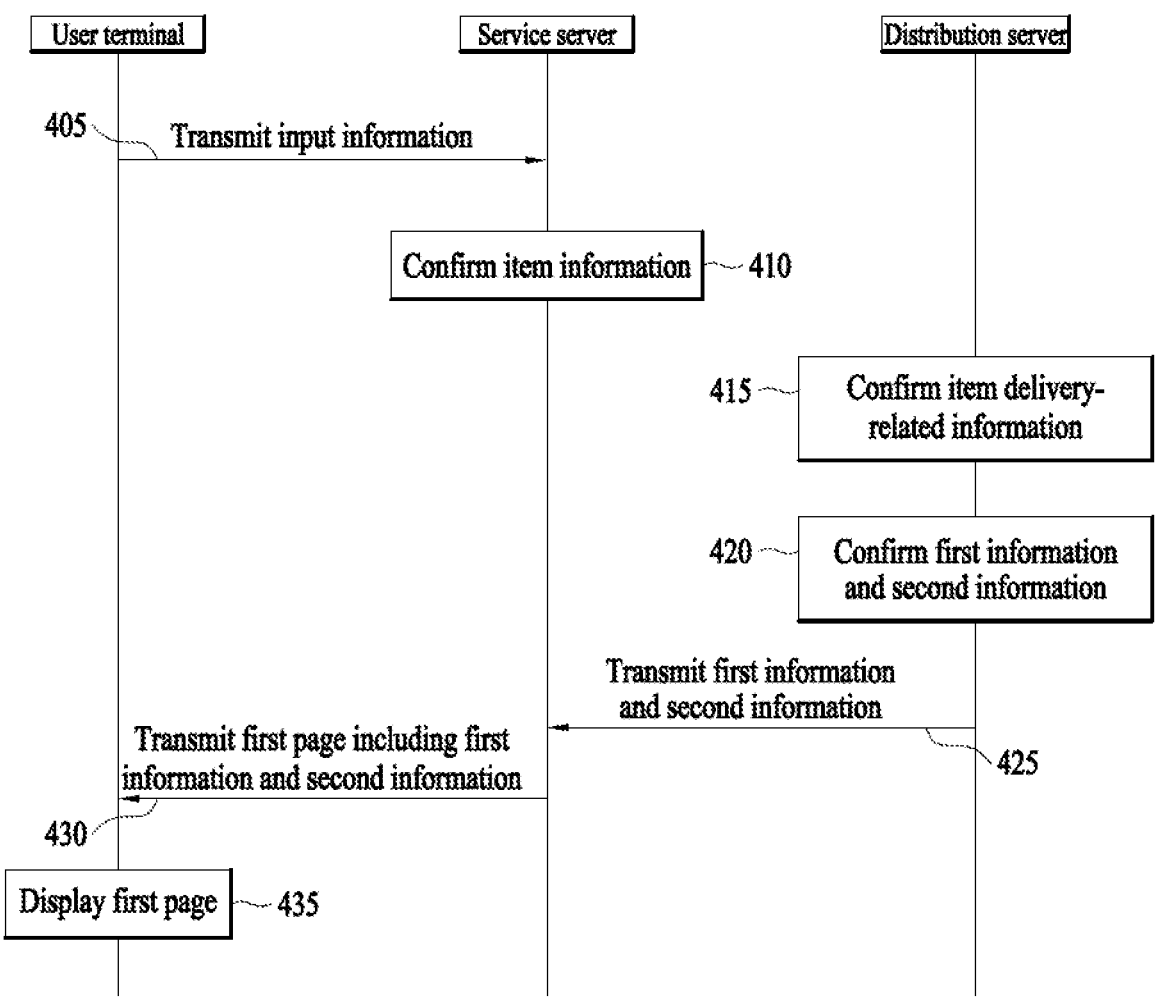
FIG. 4 is a sequence diagram illustrating information exchange of each node related to a method of providing information for adaptively displaying an estimated item arrival time according to another example embodiment of the present disclosure and an operation corresponding to the information exchange.

FIG. 4 is a sequence diagram illustrating information exchange of each node related to a method of providing information for adaptively displaying an estimated item arrival time according to another example embodiment of the present disclosure and an operation corresponding to the information exchange.

In operation 405, the user terminal may transmit the input information acquired from the user to the service server.

In operation 410, the service server may confirm the corresponding item information based on the input information received from the user terminal. The service server may confirm the corresponding item from the storage of the service server based on the input information.

In operation 415, the distribution server may check the item delivery-related information based on the item information.

In operation 420, the distribution server may confirm the first information on or regarding the estimated delivery completion time of the item and the second information on the order closing time corresponding to the first information based on the item delivery-related information. This is distinguished from confirming the first information and the second information based on the item delivery-related information acquired by the service server from the distribution server in FIG. 2.

In operation 425, the distribution server may provide the confirmed first information and second information to the service server. The distribution server may modify the item delivery-related information and the first information and the second information confirmed based on the item delivery-related information in consideration of the situation of the fulfillment center and may provide the modified first information and second information to the service server to be updated in real time.

In operation 430, the service server may provide the first page including the item information, the first information, and the second information to the user terminal.

In operation 435, the user terminal may display the first page received from the service server through the display.

FIGS. 5A to 5D are diagrams illustrating an exemplary item detail page displaying delivery time-related information of an item according to an example embodiment of the present disclosure.

Figure 5A:
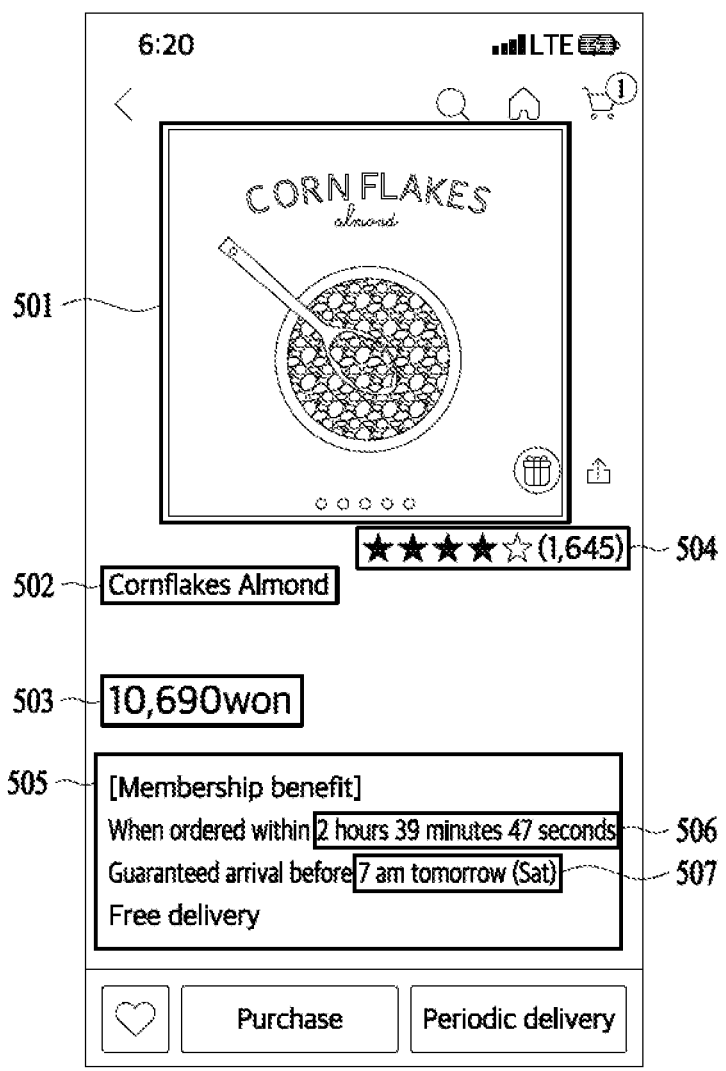
FIGS. 5A to 5D are diagrams illustrating an exemplary item detail page displaying delivery time-related information of an item according to an example embodiment of the present disclosure.

FIG. 5A illustrates an exemplary item detail page in which detailed information on an item called "cornflakes" may be confirmed. The item detail page may include an item's picture 501, an item's name 502, a sales price 503, review information 504, and delivery information 505. In the example embodiment, the delivery information 505 may indicate a guaranteed delivery completion time 507 and a remaining time 506 associated with the guaranteed delivery completion time 507. The remaining time 506 means the remaining time until the order closing time (9 pm, not illustrated) associated with the current (6:20 pm) guaranteed delivery completion time 507 (7 am tomorrow).

Figure 5B:
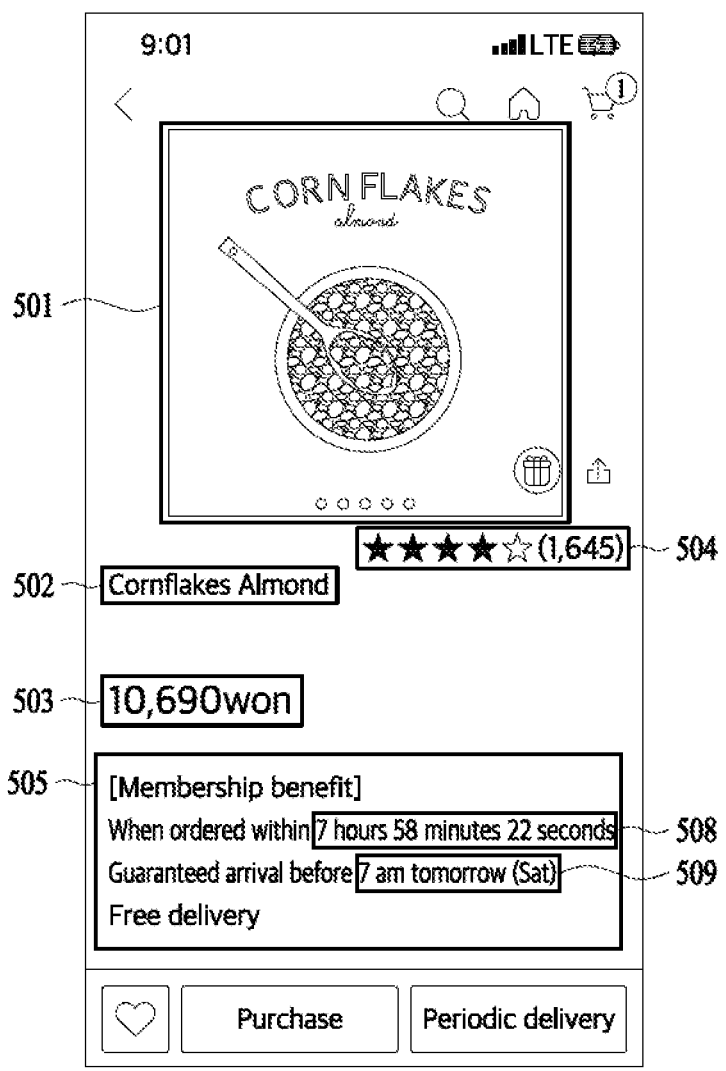

FIG. 5B illustrates that, when the order closing time of FIG. 5A has elapsed in the item detail page, the changed remaining time 508 and the changed guaranteed delivery completion time 509 are displayed. Since the current time (9:01 pm) is over the original order closing time (9 pm, not illustrated), the guaranteed delivery completion time 509 is changed to "tomorrow afternoon", and the order closing time (5 am tomorrow, not illustrated) associated with the changed guaranteed delivery completion time 509 is newly set, and thus the remaining time 508 is displayed. The changed guaranteed delivery completion time 509 may be predetermined or may be received from the distribution server in real time.

Figure 5C:
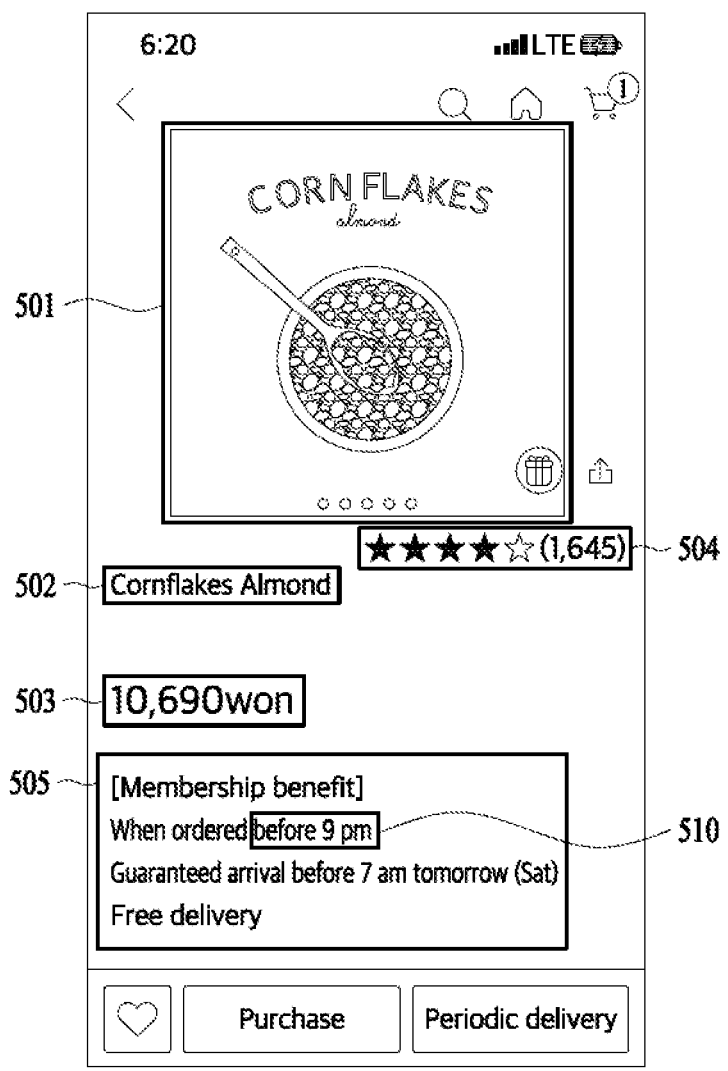

FIG. 5C illustrates that, unlike FIG. 5A in which the guaranteed delivery completion time and the remaining time are displayed in the item detail page, the guaranteed delivery completion time and an order closing time 510 associated with the guaranteed delivery completion time are displayed instead of the remaining time.

Figure 5D:
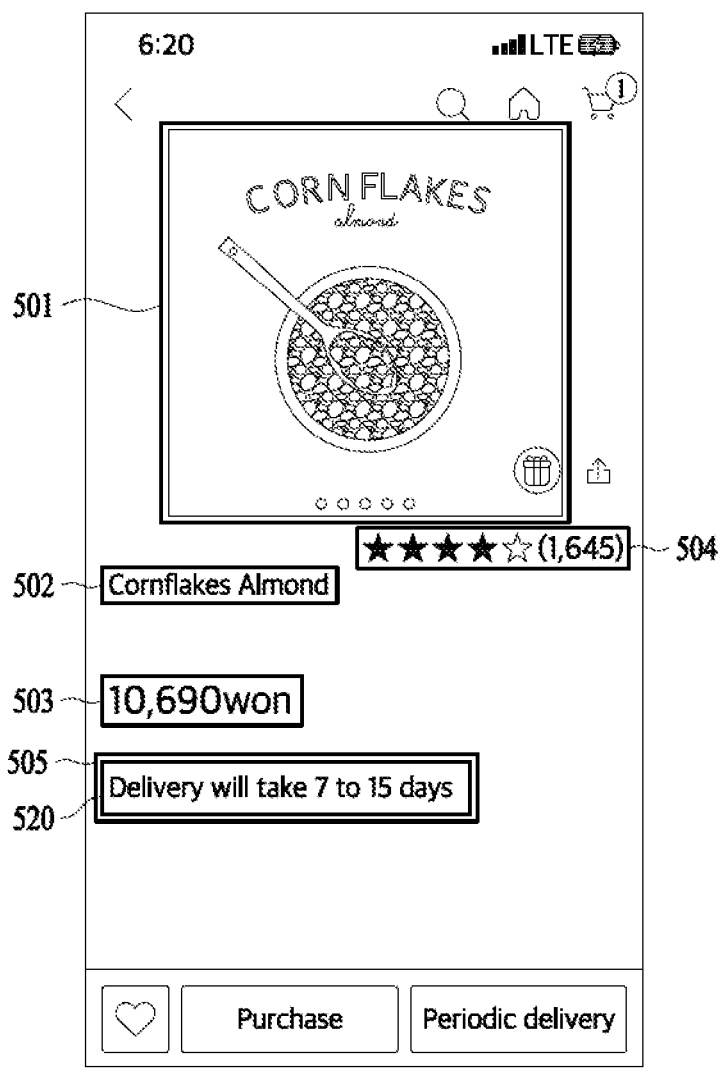

FIG. 5D illustrates information 520 indicating that it may take several days for a specific item to be delivered in a batch when it is expected that continuing the fast delivery of certain items is difficult for a certain period of time due to special circumstances is displayed on the item detail page. For example, when it is expected that fast delivery of items delivered directly from overseas to which a different distribution system than other items is applied will be difficult for the next few months, for the items delivered directly from overseas, a phrase 520 such as "Delivery will take 7 to 15 days" may be collectively displayed. Such information may be displayed not only on the item detail page, but also on the item search result page or the shopping cart page.

Figure 6A:
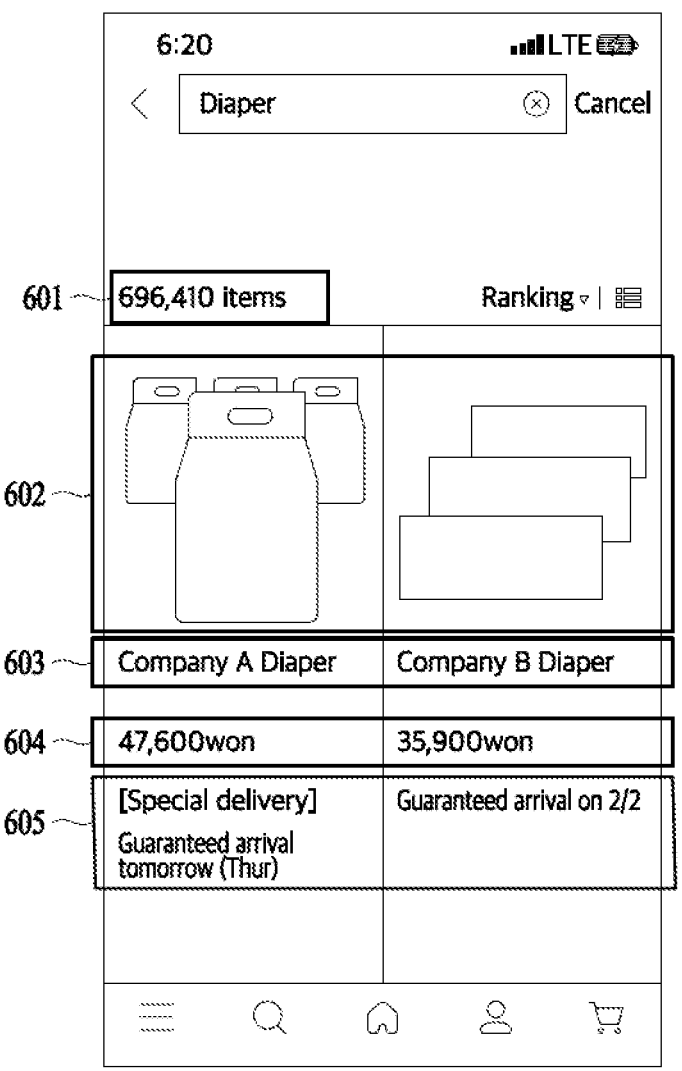
FIGS. 6A and 6B are diagrams illustrating an exemplary item search result page displaying the delivery time-related information of an item according to the example embodiment of the present disclosure.
Figure 6B:
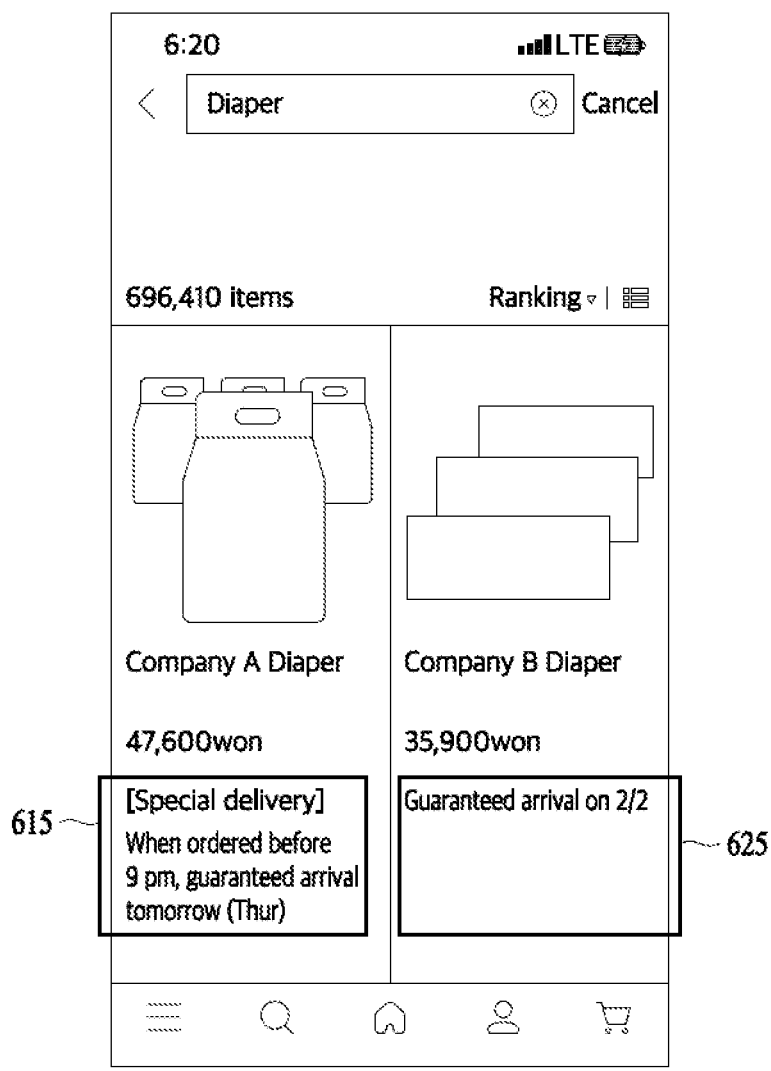

FIGS. 6A and 6B are diagrams illustrating an exemplary item search result page displaying the delivery time-related information of the item according to the example embodiment of the present disclosure.

FIG. 6A illustrates a search result page showing a search result for an item "diaper." The search result page may display the number of items 601 searched, an item's picture 602, an item's name 603, an item's sales price 604, delivery information 605 on an item, and the like. The delivery information 605 of the item may include the guaranteed delivery completion time that is different for each item.

FIG. 6B exemplarily illustrates that the order closing time associated with the guaranteed delivery completion time only for the item to which the special delivery is applied is displayed on the item's search result page as indicated by reference numeral 615, only the guaranteed delivery completion time for the item to which the special delivery is not applied is displayed, and the associated order closing time is not displayed as indicated by reference numeral 625. Although not illustrated in this drawing, the remaining time may be displayed along with the guaranteed delivery completion time. However, when the remaining time that is changed every second is displayed for each item on the search result page where several tens of items are displayed, the appearance of the page may become crowded. Therefore, it is preferable to not display the remaining time or to display the order closing time instead of the remaining time.

FIGS. 7A to 7D illustrate an exemplary shopping cart detail page displaying the delivery time-related information of the item according to the example embodiment of the present disclosure.

Figure 7A:
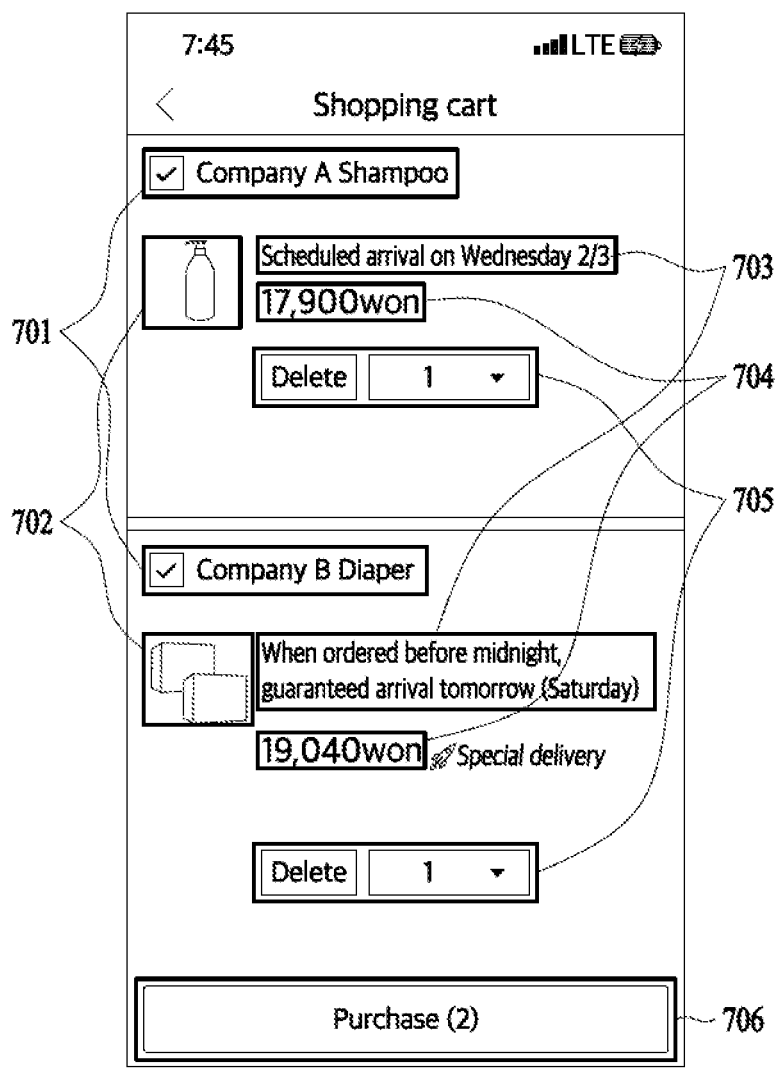
FIGS. 7A to 7D are diagrams illustrating an exemplary shopping cart detail page displaying the delivery time-related information of the item according to the example embodiment of the present disclosure.

FIG. 7A illustrates a shopping cart page showing an item to be potentially purchased, which is put in a virtual shopping cart. The shopping cart page includes an item's name 701, an item's picture 702, delivery information 703, a sales price 704, an interactive element 705 for adjusting the quantity of items, an interactive element 706 to proceed with purchase, and the like. In the example embodiment, a "shampoo" item at the top is not an item to which special delivery is applied, so only the guaranteed delivery completion time is displayed, and the order closing time or the remaining time is not displayed, whereas a "diaper" item at the bottom is an item to which special delivery referred to as "rocket delivery" is applied, so the guaranteed delivery completion time and the associated order closing time are displayed. This shows that the delivery information 703 on the item may include a different guaranteed delivery completion time for each item, and whether or not to display the order closing time may be set differently for each item.

Figure 7B:
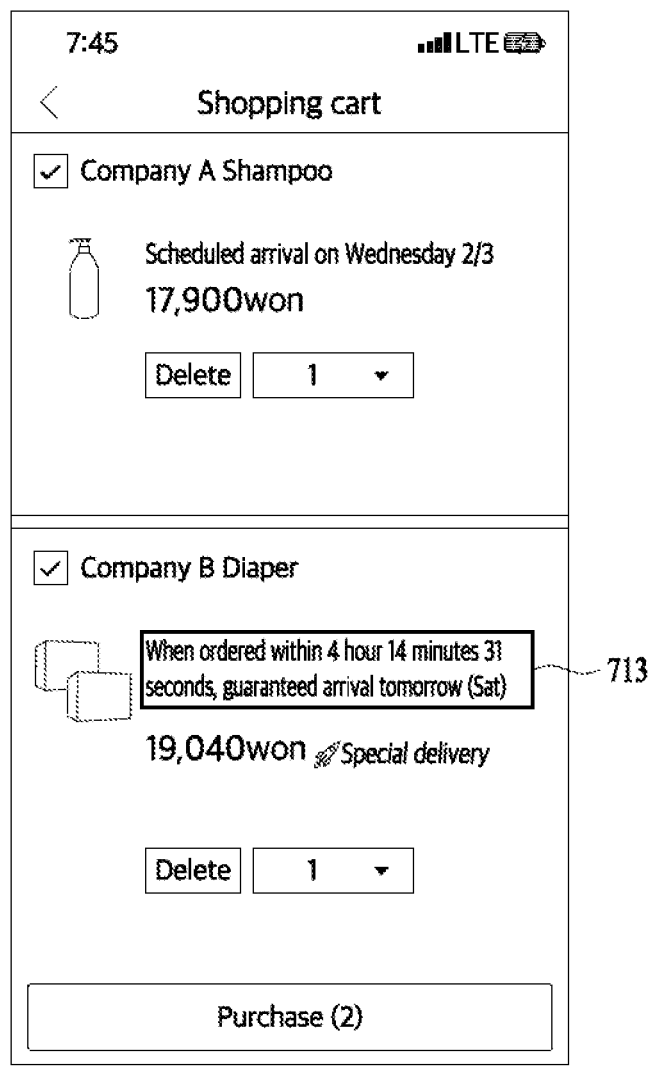

FIG. 7B shows that the remaining time 713 is displayed until the order closing time to receive the delivery within the guaranteed delivery completion time together with the guaranteed delivery completion time (tomorrow (Sat)) in displaying the delivery information of the item "diaper" on the shopping cart page.

Figure 7C:
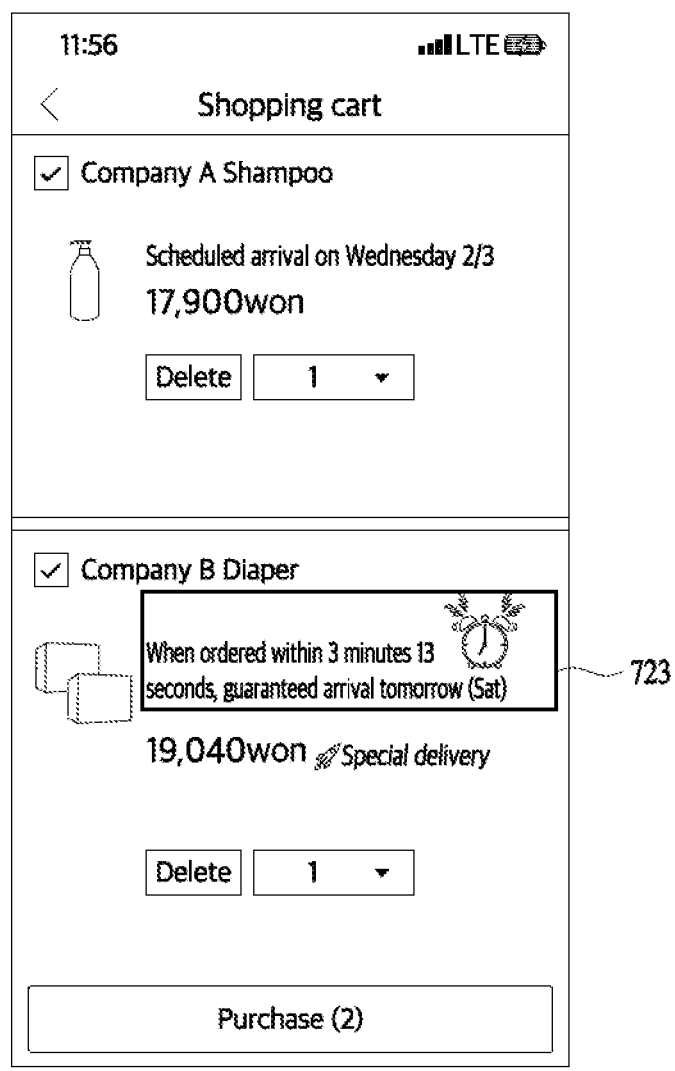

FIG. 7C illustrates that, when the remaining time is within a standard time (for example, 5 minutes) in displaying the delivery information on the item "diaper" on the shopping cart page, an alarm 723 is displayed to notify that there is not much time the order closing time left to receive the delivery within the guaranteed delivery completion time. Through this alarm, a user may recognize that he/she should place an order soon to receive the delivery of the item within the guaranteed delivery completion time, and a customer may quickly purchase an item.

Figure 7D:
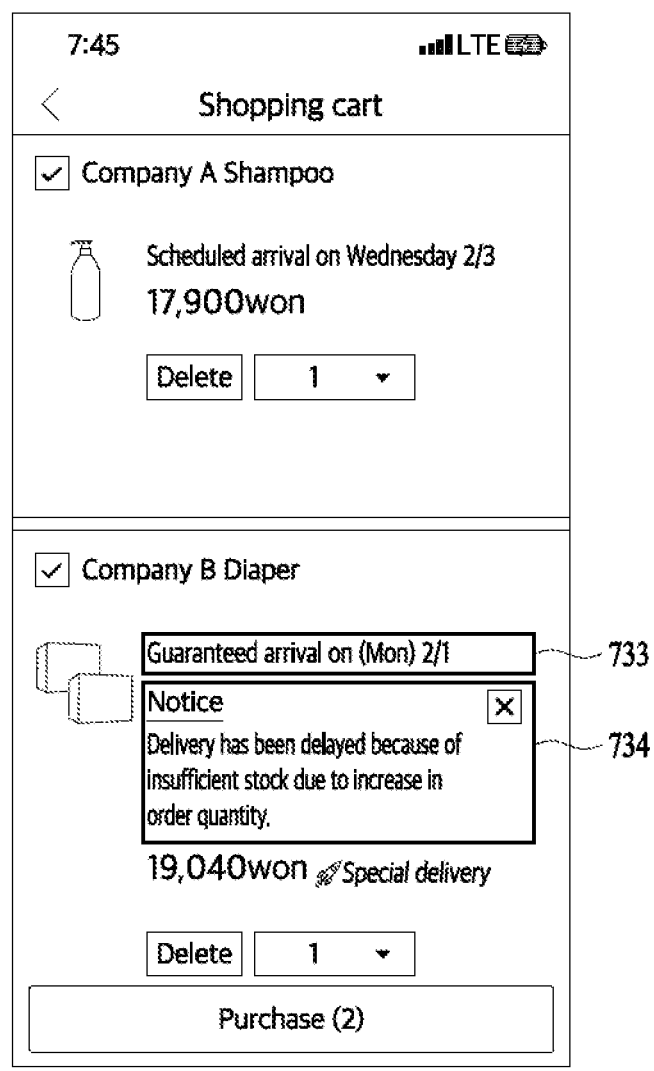

FIG. 7D illustrates that, in a case where a guaranteed delivery completion time 733 extends due to abnormal situations (for example, fulfillment center shutdown due to power outage, fulfillment center closure due to the spread of infectious diseases, delivery delay due to heavy snow, delivery delay of fulfillment center due to an explosion in order quantity, and the like) of a fulfillment center in displaying the delivery information on the item "diaper" on the shopping cart page, a window 734 notifying the user of the case is popped up. In the example embodiment, the guaranteed delivery completion time, which is set based on the information of the first fulfillment center capable of the fastest delivery among the plurality of candidate fulfillment centers selected based on the delivery destination of the user, may be updated based on the information on the second fulfillment center capable of the fastest delivery other than the first fulfillment center among a plurality of candidate fulfillment centers, so the guaranteed delivery completion time may be extended. In this way, the service server may provide the user with the accurate guaranteed delivery completion time by receiving the fulfillment center information reflecting the situation of the fulfillment center from the distribution server in real time and may provide the user with the notification when the guaranteed delivery completion time is delayed due to special situations, so the user may be prevented from receiving damage from the unexpected delivery delay or the user satisfaction may be prevented from decreasing.

Figure 8:
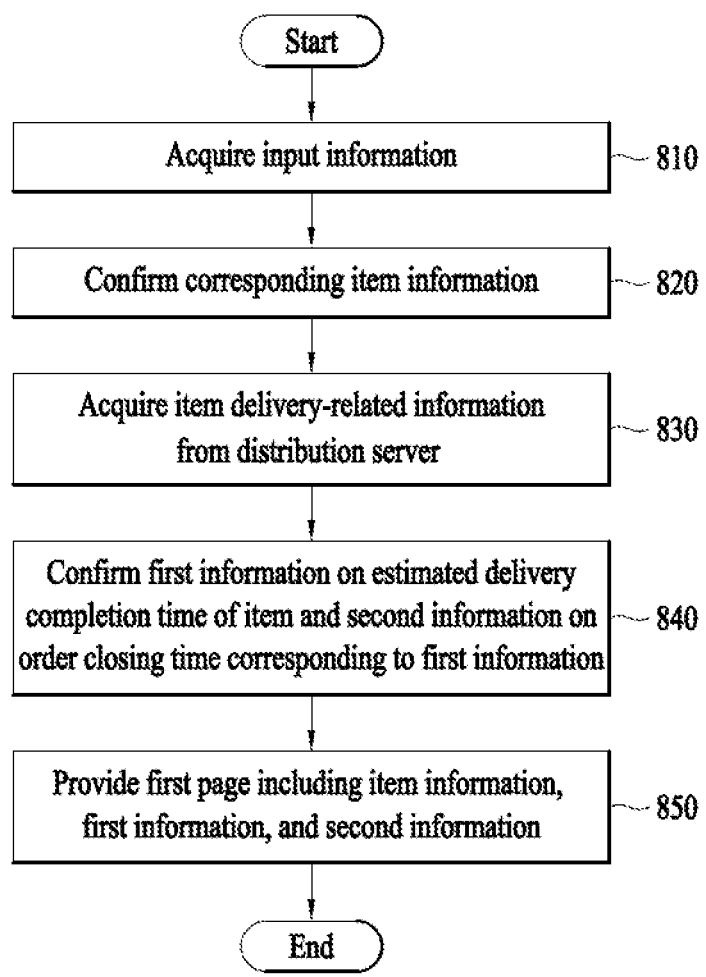
FIG. 8 is a flowchart illustrating a flow of a method of providing information in a service server according to an example embodiment of the present disclosure.

FIG. 8 is a flowchart illustrating a flow of a method of providing information in a service server according to an example embodiment of the present disclosure.

In operation 810, the service server may acquire input information from a user. The input information may include a keyword for an item, and the keyword may be a general name of the item or may be a name that limits the manufacturer, capacity, size, weight, material, or the like of the item. Keywords may be directly input to a search window by a user through the user terminal, or keywords listed on a page may be clicked or tapped by a user through the user terminal or input by using another input device.

In operation 820, the service server may confirm the corresponding item information based on the input information. The service server may confirm the corresponding item from the storage of the service server based on the input information.

In operation 830, the service server may acquire the item delivery-related information from the distribution server based on the item information. The item delivery-related information may include the fulfillment center information on or regarding the fulfillment center managed by the distribution server. The fulfillment center information may include the inventory information on the item corresponding to the item information. The inventory information of the item may include information such as the quantity, quality, storage status, and delivery availability of the item provided in the fulfillment center. In addition, the fulfillment center information may include information on available delivery personnel of the fulfillment center and whether or not the fulfillment center is abnormal (for example, delivery is impossible due to power outages, heavy snow, or the like).

In operation 840, the service server may confirm the first information on the estimated delivery completion time of the item and the second information on the order closing time corresponding to the first information based on the item delivery-related information. The estimated delivery completion time refers to the time when delivery is expected to be completed when a customer orders an item. The first information on the estimated delivery completion time may also include a guaranteed delivery completion time indicating a time period in which delivery may be ensured when the customer orders the item. The guaranteed delivery completion time may be displayed on a page as "guaranteed arrival today," "guaranteed arrival tomorrow morning," "guaranteed delivery before next Monday," or the like. The order closing time is associated with the estimated delivery completion time and may mean the latest time when an item should be ordered to receive delivery of the item at the estimated delivery completion time and may be displayed as, for example, "order before 4 pm" on the page, "order today," or the like. The first information on the estimated delivery completion time may be displayed on the page alone or may be displayed together with the second information on the order closing time (for example, "Guaranteed arrival tomorrow morning when you order before 4 pm").

In the example embodiment, the first information and the second information may vary depending on the item information, the fulfillment center information, the delivery destination address information of the user, whether a user is signed up for membership, a purchase history of a user, and the like. For example, when an item is an item to be delivered on the same day like fresh food, the guaranteed delivery completion time may be set earlier than a general case. As another example, when an item is in stock in a fulfillment center close to an address of a user, the guaranteed delivery completion time may be "guaranteed delivery today," but when the item is out of stock in the fulfillment center close to the address of the user and a fulfillment center in which an item is in stock is far from the address of the user, the guaranteed delivery completion time may be "guaranteed arrival tomorrow afternoon" or "guaranteed arrival the day after tomorrow." As another example, the service server may set the guaranteed delivery completion time only when a user is a member who is signed up for the membership, and when the user is a member who does not sign up for membership, the guaranteed delivery completion time may not be set or displayed. As another example, the service server may provide a benefit of setting the order closing time to a later time than the case where the user is the member who is signed up for the membership. As another example, when a user has a history of purchasing a number of items in the past, he/she may be assigned benefits of setting the order closing time to a later time than the original time.

In operation 850, the service server may provide the first page including the item information, the first information, and the second information to the user terminal. The first page may display the guaranteed delivery completion time alone as the delivery time-related information of the item, or the guaranteed delivery completion time may be displayed together with the order closing time corresponding to the guaranteed delivery completion time.

Figure 9:
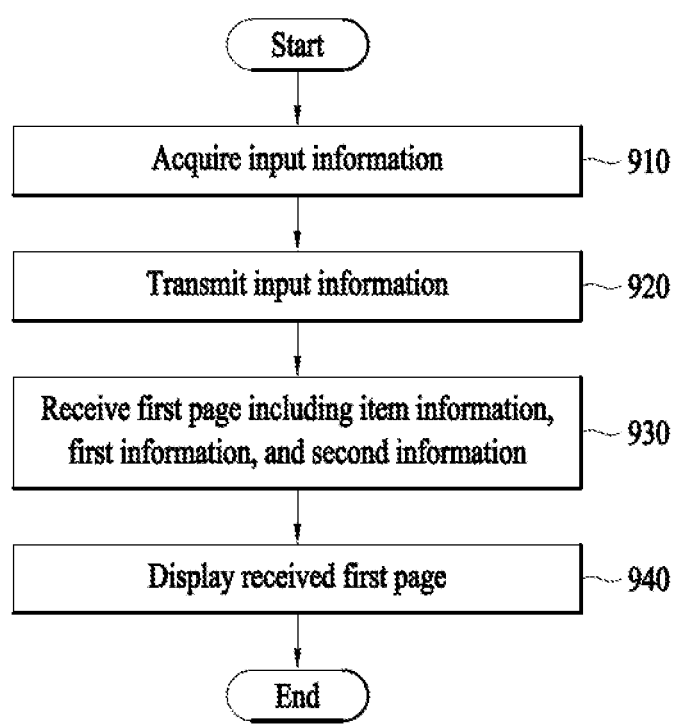
FIG. 9 is a flowchart illustrating a flow of a method of providing information in a user terminal according to an example embodiment of the present disclosure.

FIG. 9 is a flowchart illustrating a flow of a method of providing information in a user terminal according to an example embodiment of the present disclosure.

In operation 910, the user terminal may acquire input information from a user. The input information may include a keyword for an item, and the keyword may be a general name of the item or may be a name that limits the manufacturer, capacity, size, weight, material, or the like of the item. Keywords may be directly input to a search window by a user through the user terminal, or keywords listed on a page may be clicked or tapped by a user through the user terminal or input by using another input device.

In operation 920, the user terminal may transmit the acquired input information to the service server.

In operation 930, the user terminal may receive, from the service server, the first page including the item information, the first information on the estimated delivery completion time of the item, and second information on the order closing time corresponding to the first information. The service server may confirm the corresponding item information based on the input information, acquire item delivery-related information from the distribution server based on the item information, and confirm the first information and the second information based on the item delivery-related information, thereby providing the first page including the item information, the first information, and the second information to the user terminal.

In operation 940, the user terminal may display the received first page through the display.

Figure 10:
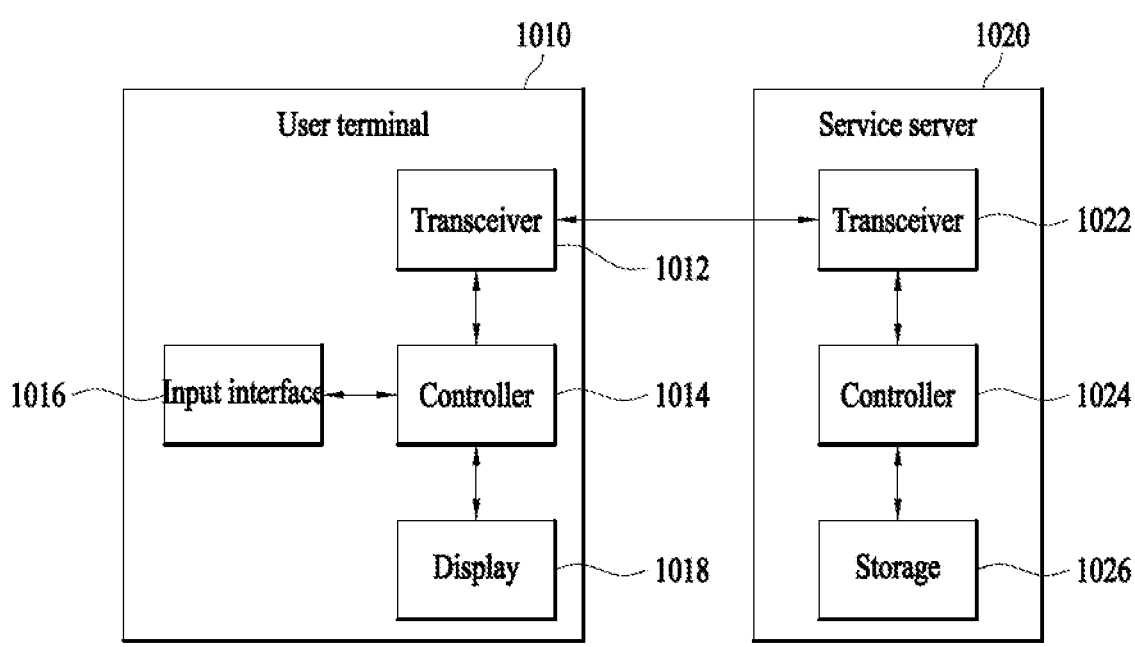
FIG. 10 is a diagram illustrating some components of a system for providing information according to an example embodiment of the present disclosure.

FIG. 10 is a diagram illustrating some components of a system for providing information according to an example embodiment of the present disclosure.

Referring to FIG. 10, a system for providing information according to the example embodiment of the present disclosure is illustrated, and the system includes a user terminal 1010 and a service server 1020 capable of communicating with each other.

The user terminal 1010 may execute an electronic commerce client program and may include a transceiver 1012, a controller 1014, an input interface 1016, and a display 1018.

The transceiver 1012 may transmit and receive information with other nodes including the service server 1020.

The input interface 1016 may receive an input of a user and may include a touch screen, a microphone, and a button.

The display 1018 may display information related to the operation of the user terminal 1010 and may display a page including the information described in the example embodiment.

The controller 1014 may control the operation of the user terminal 1010 described in the example embodiment to be performed. In addition, the controller 1014 may include at least one processor.

In addition, the user terminal 1010 may further include a speaker for outputting an event and may further include a storage (not illustrated) that stores at least some pieces of the information transmitted and received through the transceiver 1012 and information for the operation of the user terminal 1010.

The service server 1020 is a device on which an electronic commerce server program is being executed and may include a transceiver 1022, a controller 1024, and a storage 1026.

The transceiver 1022 may transmit and receive information to and from other nodes including the user terminal 1010.

The controller 1024 may control the operation of the service server 1020 described in the example embodiment to be performed. In addition, the controller 1024 may include at least one processor.

In addition, the service server 1020 may include a storage 1026 that stores at least some pieces of information transmitted and received through the transceiver 1022 and information for the operation of the service server 1020.

The example embodiments of the present disclosure have been disclosed in the present specification and drawings, and although specific terms are used, these are merely used in a general sense to easily describe the technical content of the present disclosure and to aid understanding of the present disclosure but are not intended to limit the scope of the present disclosure. It is obvious to those skilled in the art to which the present disclosure pertains that other modifications based on the technical idea of the present disclosure can be implemented in addition to the example embodiments disclosed herein.

DESCRIPTION OF THE REFERENCE NUMERALS

101: User terminal
120: Service server
131, 132, 133: Distribution servers

What is claimed is:

1. A method of providing information by a service server, the method comprising:
   acquiring, by a processor of the service server, input information from a user terminal;
   confirming, by the processor of the service server, corresponding item information based on the input information;
   acquiring, by the processor of the service server, item delivery-related information from a distribution server based on the item information;
   confirming, by the processor of the service server, first information regarding an estimated delivery completion time of the item and second information regarding an order closing time corresponding to the first information based on the item delivery-related information; and
   generating, by the processor of the service server, a code configured to cause the user terminal to display a first page including the item information, the first information, and the second information,
   wherein the item delivery-related information is confirmed based on information regarding a first fulfillment center available for fastest delivery among one or more candidate fulfillment centers selected based on delivery destination information of the user,
   wherein the second information is determined based on an estimated release time information of the first fulfillment center,
   wherein the estimated release time information is determined based on available delivery personnel information of the first fulfillment center and abnormality information of the first fulfillment center;
   wherein the method further comprises: identifying, by the processor of the service server, the abnormality information of the first fulfillment center indicating that the first fulfillment center is in a non-operative state, and, in response to identifying the abnormality information of the first fulfillment center, updating, by the processor of the service server, the first information based on information regarding a second fulfillment center available for second fastest delivery other than the first fulfillment center among the one or more candidate fulfillment centers, and
   wherein the first information includes a guaranteed delivery completion time of the item.

2. The method of claim 1, wherein the item delivery-related information is acquired by additionally considering delivery destination information of the user and fulfillment center information corresponding to the delivery destination information.

3. The method of claim 1, wherein
the second information includes a remaining time until the order closing time corresponding to the first information.

4. The method of claim 1, wherein the first page additionally displays a notification related to the update.

5. The method of claim 1, wherein at least one of the first information or the second information varies depending on whether the user is signed up for membership.

6. The method of claim 1, wherein at least one of the first information or the second information varies depending on an item purchase history of the user.

7. The method of claim 1, wherein the first page is one of: a page displaying detailed information of the item, a page displaying a search result of the item, or a page displaying a list of items selected by the user.

8. The method of claim 3, wherein:
the first information includes a fastest guaranteed delivery completion time and a second-fastest guaranteed delivery completion time, and
in response to determining that the remaining time is less than or equal to zero, the first information and the second information are updated based on the second-fastest guaranteed delivery completion time.

9. The method of claim 3, wherein the first page additionally displays an alarm in response to determining that the remaining time is within a reference time.

10. A method of providing information by a user terminal, the method comprising:
acquiring, by a processor of the user terminal, input information from a user;
transmitting, by the processor of the user terminal, the acquired input information to a service server;
receiving, by the processor of the user terminal, a first page from the service server; and
displaying, by the processor of the user terminal, the received first page,
wherein the service server is configured to:
confirm corresponding item information based on the input information;
acquire item delivery-related information from a distribution server based on the item information;
confirm first information regarding an estimated delivery completion time of the item and second information regarding an order closing time corresponding to the first information based on the item delivery-related information; and
generate a code configured to cause the user terminal to display the first page including the item information, the first information, and the second information,
wherein the item delivery-related information is confirmed based on information regarding a first fulfillment center available for fastest delivery among one or more candidate fulfillment centers selected based on delivery destination information of the user,
wherein the second information is determined based on an estimated release time information of the first fulfillment center,
wherein the estimated release time information is determined based on available delivery personnel information of the first fulfillment center and abnormality information of the first fulfillment center;
wherein the service server is further configured to: identify the abnormality information of the first fulfillment center indicating that the first fulfillment center is in a non-operative state, and, in response to identifying the abnormality information of the first fulfillment center, update, by a processor of the service server, the first information based on information regarding a second fulfillment center available for second fastest delivery other than the first fulfillment center among the one or more candidate fulfillment centers, and
wherein the first information includes a guaranteed delivery completion time of the item.

11. A service server for providing information, the service server comprising:
a transceiver configured to transmit and receive information to and from other apparatuses; and
a processor controlling the transceiver and configured to:
acquire input information from a user terminal;
confirm corresponding item information based on the input information;
acquire item delivery-related information from a distribution server based on the item information;
confirm first information regarding an estimated delivery completion time of the item and second information regarding an order closing time corresponding to the first information based on the item delivery-related information; and
generate a code configured to cause the user terminal to display a first page including the item information, the first information, and the second information,
wherein the item delivery-related information is confirmed based on information regarding a first fulfillment center available for fastest delivery among one or more candidate fulfillment centers selected based on delivery destination information of the user,
wherein the second information is determined based on an estimated release time information of the first fulfillment center,
wherein the estimated release time information is determined based on available delivery personnel information of the first fulfillment center and abnormality information of the first fulfillment center;
wherein the processor is further configured to: identify the abnormality information of the first fulfillment center indicating that the first fulfillment center is in a non-operative state, and, in response to identify the abnormality information of the first fulfillment center, update the first information based on information regarding a second fulfillment center available for second fastest delivery other than the first fulfillment center among the one or more candidate fulfillment centers, and
wherein the first information includes a guaranteed delivery completion time of the item.

12. A user terminal for providing information, the user terminal comprising:
a transceiver configured to transmit and receive information to and from other apparatuses; and
a processor controlling the transceiver and configured to:
acquire input information from a user;
transmit the acquired input information to a service server;
receive a first page from the service server; and
display the received first page,
wherein the service server is configured to:
confirm corresponding item information based on the input information;
acquire item delivery-related information from a distribution server based on the item information;
confirm first information regarding an estimated delivery completion time of the item and second information regarding an order closing time corresponding to the first information based on the item delivery-related information; and generate a code configured to cause the user terminal to display the first page including the item information, the first information, and the second information, wherein the item delivery-related information is confirmed based on information regarding a first fulfillment center available for fastest delivery among one or more candidate fulfillment centers selected based on delivery destination information of the user, wherein the second information is determined based on an estimated release time information of the first fulfillment center, wherein the estimated release time information is determined based on available delivery personnel information of the first fulfillment center and abnormality information of the first fulfillment center;

wherein the service server is further configured to: identify the abnormality information of the first fulfillment center indicating that the first fulfillment center is in a non-operative state, and, in response to identifying the abnormality information of the first fulfillment center indicating the first fulfillment center is in a non-operative state, update the first information based on information regarding a second fulfillment center available for second fastest delivery other than the first fulfillment center among the one or more candidate fulfillment centers, and wherein the first information includes a guaranteed delivery completion time of the item.

13. The method of claim 1, wherein the non-operative state is due to a non-order based situation at the first fulfillment center.

* * * * *